(No Model.)
R. C. CLARK.
PROCESS OF RENEWING BONE BLACK.
No. 279,335. Patented June 12, 1883.
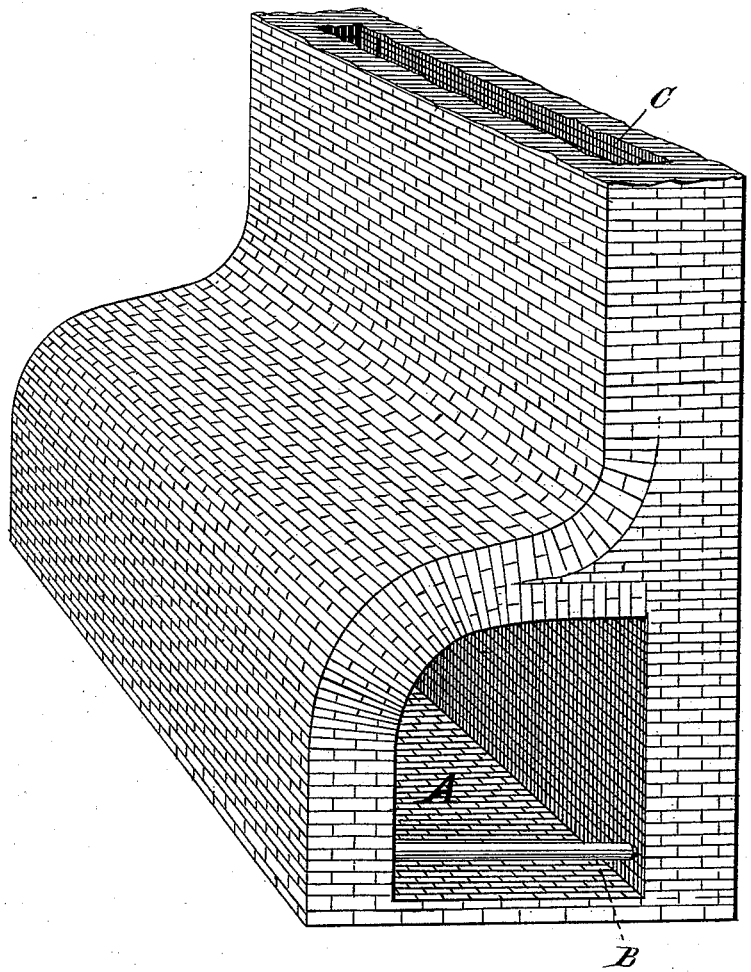
WITNESSES
INVENTOR
Rolin C. Clark
By Leggett & Leggett
ATTORNEYS

UNITED STATES PATENT OFFICE.

ROLLIN C. CLARK, OF CORRY, PENNSYLVANIA, ASSIGNOR TO HIMSELF AND MURRAY H. WARREN, OF SAME PLACE.

PROCESS OF RENEWING BONE-BLACK.

SPECIFICATION forming part of Letters Patent No. 279,335, dated June 12, 1883.

Application filed May 3, 1883. (No model.)

*To all whom it may concern:*

Be it known that I, ROLLIN C. CLARK, of Corry, in the county of Erie and State of Pennsylvania, have invented certain new and useful Improvements in Processes of Renewing Bone-Black that has been Used for Filtering Oil; and I do hereby declare the following to be a full, clear, and exact description of the invention, such as will enable others skilled in the art to which it appertains to make and use the same.

My invention relates to improvements in renewing or purifying "bone-black" that has been used for filtering oils; and it consists in a process and apparatus, that are hereinafter described, and pointed out in the claim.

It is well known to those skilled in the art that oils are purified or filtered by passing through animal-charcoal, known as "bone-black," and that the purification is accomplished by means of the absorption of the impurities of the oils by the bone-black. This process may continue until the bone-black becomes so saturated or filled with these impurities that it can receive no more. The bone-black itself is then purified or renewed by heating it and burning out these impurities. This has heretofore usually been done in pots or closed vessels, in order to save as much as possible the carbon and phosphate. This treatment in renewing the bone-black may be satisfactory when the bone-black is used for refining sugar and other purposes, but in filtering oil bone-black that has been renewed in this manner is of little value afterward.

Instead of renewing the bone-black in vessels, as aforesaid, and excluding the air, my process consists of renewing or burning it on an open hearth or floor and stirring it thoroughly, that all parts may be well exposed to the air, the impurities of the oil furnishing the means of combustion. When these impurities are all burned out and the combustion ceases, the bone-black will have been thoroughly renewed, and, when cooled, ready for use. Under this treatment bone-black is usually better after the first and second renewals than when new, and may be used and renewed many times before its purifying or filtering qualities are exhausted.

In the drawing the figure is a view in perspective of a hearth well adapted to renew bone-black by the process that I have described.

A represents a hearth open at both ends, and at each end provided with a roller, as at B, on which to rest or support the hoe, rake, or other devices used in stirring the bone-black.

C is a chimney for carrying off the fumes.

The bone-black, when filled with impurities from the oil, is spread on the floor A and burned or renewed, as hereinbefore described.

What I claim is—

The process herein described of burning or renewing bone-black for filtering oil, and more especially carbon-oils, consisting of the following steps: first, spreading the impure bone-black on an open hearth and burning it by means of the combustible matter contained therein, meanwhile stirring it thoroughly and exposing all parts of the burning mass to the air, substantially as and for the purpose set forth.

In testimony whereof I have signed this specification in the presence of two subscribing witnesses.

ROLLIN C. CLARK.

Witnesses:
C. H. DOVER,
GEO. W. KING.